US005544611A

United States Patent [19]

Fahringer, Sr. et al.

[11] Patent Number: 5,544,611

[45] Date of Patent: Aug. 13, 1996

[54] BOAT TO TRAILER PROXIMITY INDICATOR

[75] Inventors: Stephen Fahringer, Sr.; Stephen Fahringer, Jr., both of Dublin, Calif.

[73] Assignee: Fahringer Enterprises, Dublin, Calif.

[21] Appl. No.: 240,226

[22] Filed: May 10, 1994

[51] Int. Cl.$^{6}$ .......... B63B 35/00

[52] U.S. Cl. .......... 114/343; 280/DIG. 14; 340/438

[58] Field of Search .......... 280/414.1, DIG. 14; 414/401, 529, 584, 559; 340/431, 438, 932.2, 435, 933, 686–689; 114/344, 343, 270; 116/204, 28 R

[56] References Cited

U.S. PATENT DOCUMENTS

| | | | |
|---|---|---|---|
| 3,419,798 | 12/1968 | Walton | 324/45 |
| 3,445,796 | 5/1969 | Spiroch et al. | 335/205 |
| 3,500,025 | 3/1970 | Moulin et al. | 235/150.27 |
| 4,316,253 | 2/1982 | Posseme | 364/432 |
| 4,982,106 | 1/1991 | Castellanet et al. | 307/120 |
| 5,013,206 | 5/1991 | Ernst et al. | 414/483 |
| 5,097,250 | 3/1992 | Hernandez | 280/DIG. 14 |
| 5,142,658 | 8/1992 | McMorran et al. | 382/1 |
| 5,189,612 | 2/1993 | Lemercier et al. | 364/424.02 |
| 5,193,835 | 3/1993 | Sheets | 280/414.1 |
| 5,195,767 | 3/1993 | Des Roches | 280/414.1 |

*Primary Examiner*—Edwin L. Swinehart
*Attorney, Agent, or Firm*—Dorsey & Whitney LLP

[57] ABSTRACT

The present invention discloses an apparatus for positioning a boat onto a boat trailer comprising two magnetic reed switches attached inside the bilge of the boat along the central, longitudinal axis of the boat; an indicator box mounted in the boat and electrically connected to the magnetic reed switches for providing a signal when the boat is properly positioned onto the boat trailer; and two permanent magnets attached to the boat trailer along the longitudinal, central axis of the boat trailer. When the boat is moved onto the boat trailer such that the permanent magnets attached to the boat trailer are adjacent the magnetic reed switches inside the boat, the magnetic reed switches close, thereby causing the indicator box to signal that the boat is properly positioned onto the boat trailer.

31 Claims, 6 Drawing Sheets

12
14
15
16
18
19
20
22
23
24
26
27
28
29
30
31
32
33
34
36
37
38
39
40
42
44
46
50
52
53
54
55
56
57
59
60

59
60
60
60
56
37
37
48
53
41
57
54
16
55
50
44
42
53
52

BOAT TO TRAILER PROXIMITY INDICATOR

TECHNICAL FIELD

The present invention generally relates to apparatuses for positioning a vehicle, such as a boat, on a carriage, such as a boat trailer. In particular, an apparatus using an electromagnetically actuated switch to indicate to the user that the boat is properly positioned onto the boat trailer before pulling the boat trailer with the boat out of the water.

BACKGROUND OF THE INVENTION

Lakeside loading of a boat onto the trailer often poses a difficult problem, especially when attempting to handle the boat in windy conditions with heavy waves interfering with retrieval. The task becomes more difficult as the boat size or the wind profile increases. Typically, the boat trailer is attached to the rear of a car or truck and is backed into the water from which the boat is to be retrieved. Guiding the boat onto the trailer, achieving proper positioning of the boat with respect to the rollers and other structural components of the boat trailer, and indicating to the driver of the boat that the boat is in the proper position are three steps in the loading of a boat onto a boat trailer which can be very difficult. Often one person is required to ride in the boat to steer it toward the trailer while at least one other person must stand in the water near the trailer to help guide the boat. Moreover, the person helping guide the boat must indicate to the driver that the boat is in the proper position.

Several patents provide apparatuses for aiding boats to be loaded onto boat trailers. U.S. Pat. No. 5,195,767 to Des Roches discloses a guide rail system which attaches to the sides of a trailer to assist in retrieving boats when they leave the water. U.S. Pat. No. 5,013,206 to Ernst discloses a boat trailer having a frame and guide member. The guide member, which may be a pair of cables trained over a plurality of upright stanchions mounted on the frame, defines a "V" shaped channel dimensioned to receive and guide a boat. However, these patents do not disclose an apparatus for loading a boat which can notify the driver that the boat is properly positioned onto the boat trailer.

U.S. Pat. No. 4,316,253 to Possémédiscloses an apparatus for positioning a body by means of a magnetic field. Magnetometers are placed within the moving body, such as a boat. Means for measuring the moving body's angle of orientation are also provided. The magnetometers and measuring means provide data with respect to an electrical source at a fixed position. Circuits process the information and guide the moving body. However, this patent does not disclose a convenient apparatus to be installed onto a boat and boat trailer.

Clearly, there is a need for a boat proximity indicator which is easy to install and use. Furthermore, there is a need for a boat proximity indicator which will allow the boat driver to load the boat onto a boat trailer without the assistance of others.

SUMMARY OF THE INVENTION

The present invention discloses an apparatus for positioning a boat onto a boat trailer comprising two magnetic reed switches attached inside the bilge of the boat along the central, longitudinal axis of the boat; an indicator box mounted in the boat and electrically connected to the magnetic reed switches for providing a signal when the boat is properly positioned onto the boat trailer; and two permanent magnets attached to the boat trailer along the longitudinal, central axis of the boat trailer. The permanent magnets are embedded in a float, which moves vertically with respect to the boat trailer when the boat trailer is immersed in water. A bracket, which is fixedly attached to the boat trailer, is connected to the float by an arm assembly.

During operation, when the boat trailer is backed into the water, the float moves vertically relative to the boat trailer. The float provides a visual indication to the boat driver of the location of the boat trailer. The boat driver should point the bow of the boat towards the float. When the boat is moved onto the boat trailer such that the permanent magnets attached to the boat trailer are adjacent the magnetic reed switches inside the boat, the magnetic reed switches close because of the magnetic field from the permanent magnets in the float. This closing of the magnetic reed switches causes the indicator box to signal that the boat is properly positioned onto the boat trailer.

One object of the present invention is to provide an apparatus which notifies the boat driver when the boat is properly positioned onto the boat trailer.

Another object of the present invention is to provide an apparatus which enables one person to load a boat onto a boat trailer.

Another object of the present invention is to provide an apparatus which can be easily installed and used with existing boats and boat trailers.

Another object of the present invention is to provide an apparatus to load a boat onto a boat lift and dry docks.

The above objects, advantages, and features of the present invention will become more apparent upon reference to the following description thereof with respect to the appended drawings. However, before referring to the description and to the drawings, it is to be appreciated that the following description is given by way of the presently preferred embodiment only. Accordingly, various modifications may be made to the invention without departing from the spirit and scope of the following described invention. Such description should also not in any way be interpreted to limit the scope of the invention. It is to be further appreciated that to the extent like numerals are used in the various drawings, they describe like components.

DETAILED DESCRIPTION OF THE PREFERRED EMBODIMENT

Although this detailed description will be directed to use of the present invention with respect to a boat and a boat trailer, the present invention is equally applicable for positioning a boat onto boat lifts and dry docks, and for positioning a vehicle onto a carriage. Thus, this description of the present invention does not limit the use of the present invention to boats and boat trailers.

Figure 1:
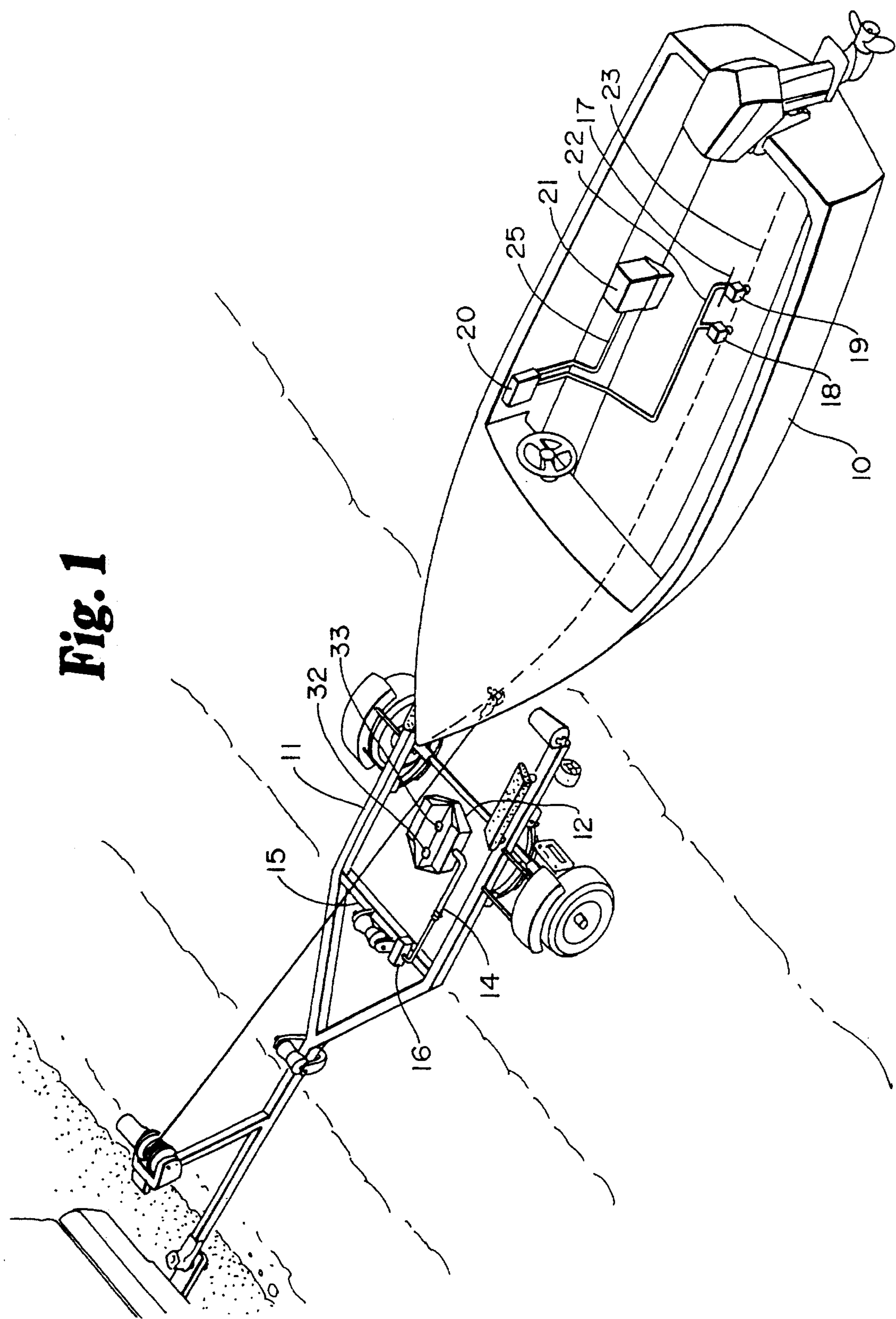
FIG. 1 shows a perspective view of the present invention with a boat and a boat trailer.

FIG. 1 illustrates a boat 10 approaching the boat trailer 11 in which an apparatus to position a boat 10 onto a boat trailer 11 (hereinafter "boat proximity indicator") is installed. On the boat 10, two magnetic reed switches 18, 19 and an indicator box 20 are installed. The magnetic reed switches 18, 19 are electrically connected to the indicator box 20 by a wire harness 22. Also, the indicator box 20 is connected to a power supply 21.

On the boat trailer 11, a bracket 16 is attached to a cross frame 15 of the boat trailer 11. A float 12 with two permanent magnets 32, 33 embedded in the float 12, is rotatably connected to the bracket 16 by an arm assembly 14.

Figure 3:
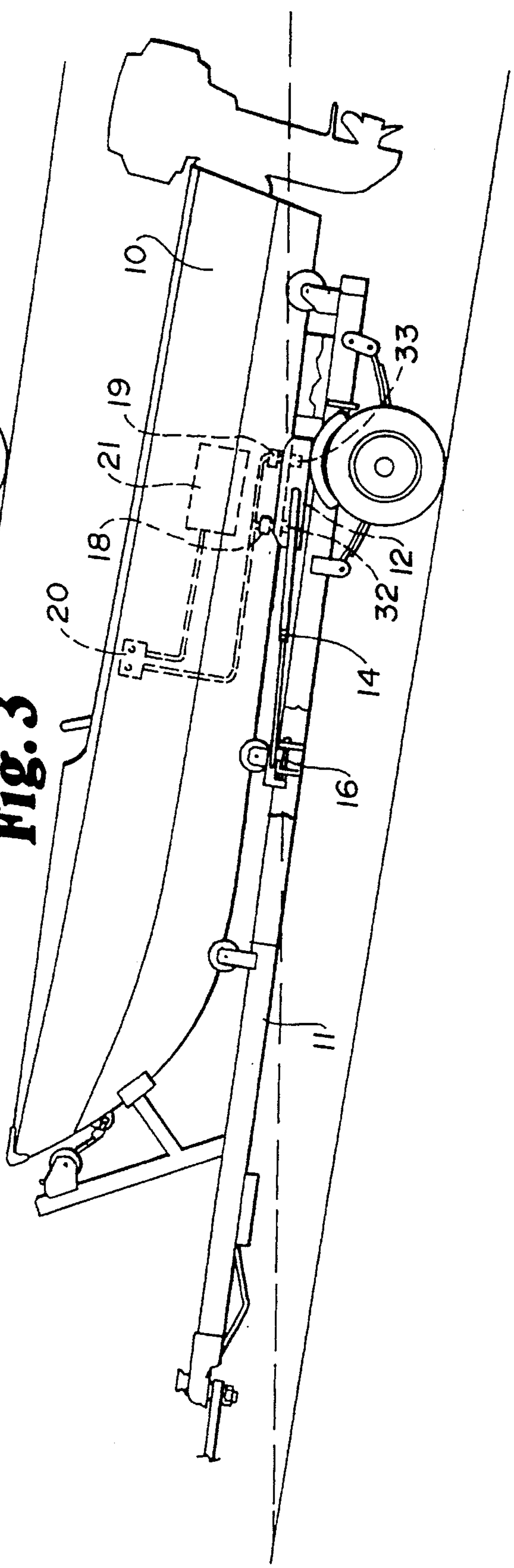
FIG. 3 shows a left side elevated view of the present invention with a boat loaded onto the boat trailer in the proper position.

As illustrated in FIG. 3, when the boat 10 is properly positioned onto the boat trailer 11, the permanent magnets 32, 33 are adjacent the magnetic reed switches 18, 19. When the permanent magnets 32, 33 are adjacent the magnetic reed switches 18, 19 inside the boat 10, the magnetic reed switches 18, 19 are closed, thereby causing the indicator box 20 to signal that the boat 10 is properly positioned onto the boat trailer 11.

First, the components and the installation of the components in the boat 10 will be described under the present invention. Second, the components and the installation of the components on the boat trailer 11 will be described.

Figure 2:
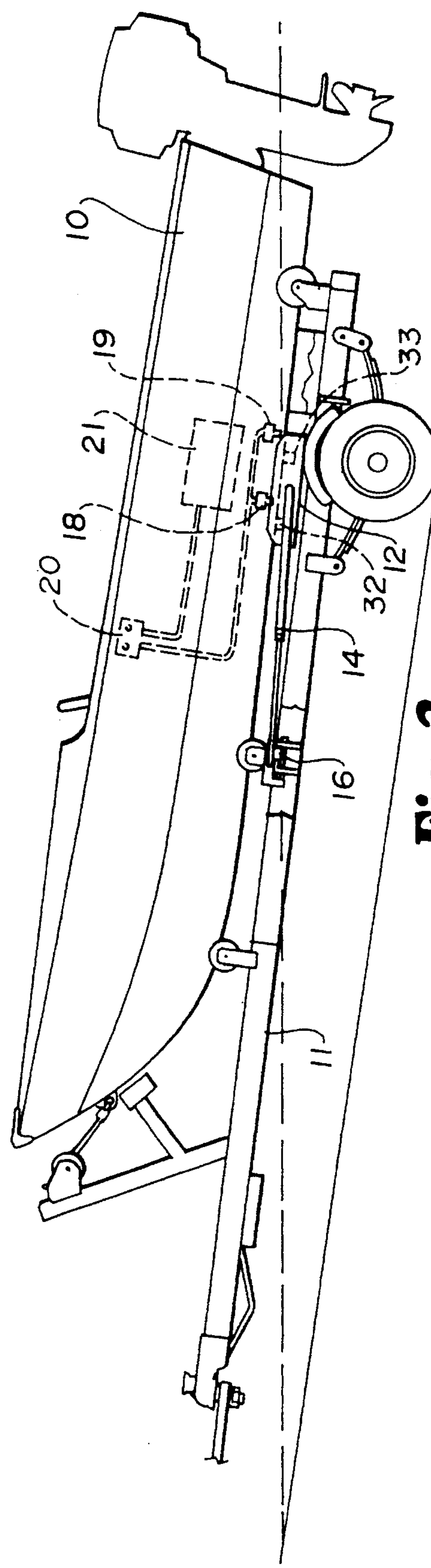
FIG. 2 shows a left side elevated view of the present invention with a boat being loaded onto a boat trailer.

FIGS. 1–3 illustrates the components installed on the boat 10. The magnetic reed switches 18, 19 are fixedly attached inside the bilge 17 of the boat 10. Preferably, the user should install the magnetic reed switches 18, 19 in an area that is easily accessible to the user. Tape or epoxy can be used to attach the magnetic reed switches 18, 19 inside the bilge 17 of the boat 10. Tape or epoxy is applied to the face opposite the side from which the wire 22 extends from the magnetic reed switches 18, 19.

Figure 9:
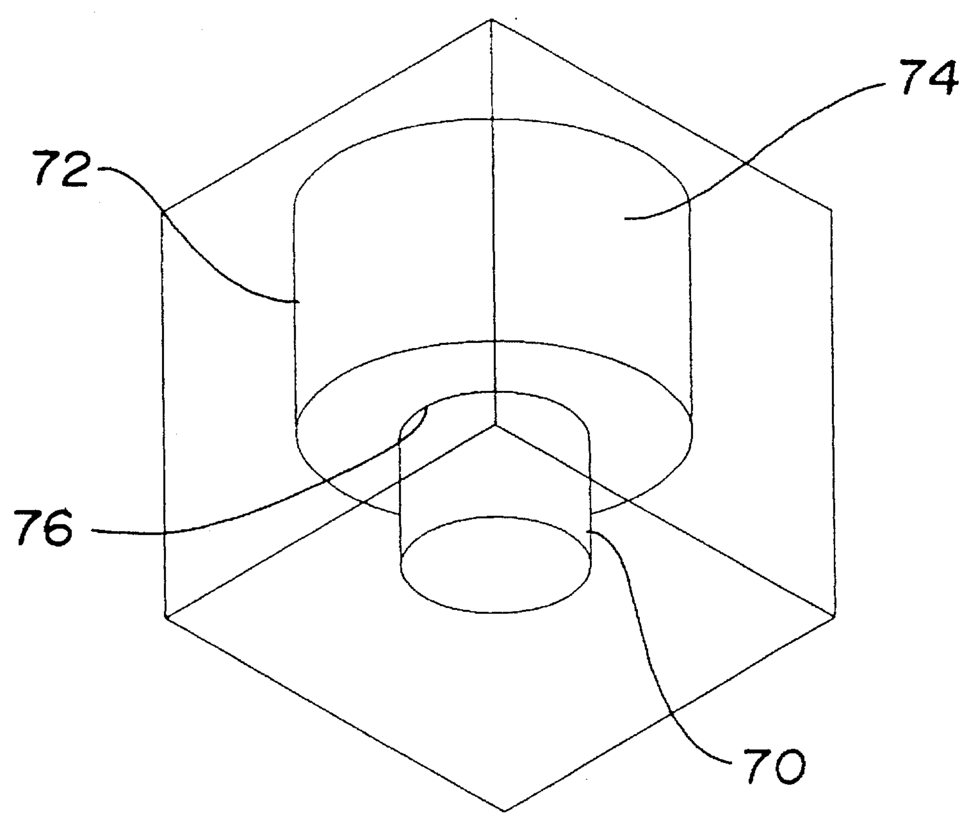
FIG. 9 shows a bottom view of a magnetic reed switch.

As shown in FIG. 9, the magnetic reed switches 18, 19 are comprised of a switch 70, a steel tube 72, and a plastic case 74. The tube 72 has a bore 76 for snugly holding the switch 70. A plastic case 74 encloses the tube 72 with the switch 70.

The location of the tube 72 in relation to the switch 70 is important. The tube 72 regulates the effect of the magnetic flux on the switch 70, enabling the sensitivity and accuracy of the indicator to be changed by vertically moving the tube 72 around and over the switch 70.

In the preferred embodiment, the magnetic reed switches 18, 19 are located along the central, longitudinal axis 23 of the boat 10. The central, longitudinal axis 23 extends from the front tip of the boat to the back of the boat 10. In the preferred embodiment, the magnetic reed switches 18, 19 should be twelve (12) inches apart. However, to practice the present invention, the magnetic reed switches 18, 19 do not have to be placed twelve inches apart from each other as long as the distance the magnetic reed switches 18, 19 are placed from each other is approximately equal to the distance between the two permanent magnets 32, 33 attached to the boat trailer 11, so that when the boat 10 is properly positioned on the boat trailer 11, the magnetic reed switches 18, 19 are adjacent the permanent magnets 32, 33. Moreover, in terms of location of the magnetic reed switches 18, 19, as long as the magnetic reed switches 18, 19 are placed inside the bilge 17 of the boat 10 so that when the boat 10 is properly positioned onto the boat trailer 11, the magnetic reed switches 18, 19 are adjacent the permanent magnets 32, 33 attached to the boat trailer 11, the indicator box 20 will signal when the boat 10 is properly positioned onto the boat trailer 11.

In the preferred embodiment, the magnetic reed switches 18, 19 are color coded red and green. The colors correspond to two colored lights, i.e., a red light and a green light, in the indicator box 20.

Although the present invention can be practiced with one or more magnetic reed switches, in the preferred embodiment, there are two magnetic reed switches 18, 19. By using two magnetic reed switches 18, 19, there is a greater degree of certainty that the boat 10 is properly positioned onto the boat trailer 11. Also, by having two magnetic reed switches 18, 19, the boat driver can be given an early signal that the boat 10 is almost in the proper position on the boat trailer 11.

The indicator box 20 is fixedly attached inside the boat 10. The indicator box 20 is fixed to the dash board or relatively close to the dash board of the boat 10. The indicator box 20 can be attached to the dash board with velcro or any other adhesive.

The indicator box 20 is connected to the magnetic reed switches 18, 19 by the wire harness 22. The indicator box 20 has an amber light 26 and a green light 24. Each light 24, 26 corresponds to a magnetic reed switch 18, 19. Also, the indicator box 20 has speaker holes 28 with a speaker (not shown) inside the indicator box 20. The lights 24, 26 provide a visual indicator and the speaker through the speaker holes 28 provides an audio indicator to the boat driver that the boat 10 is properly positioned onto the boat trailer 11. However, it is not necessary to have both audio and visual indicators.

The indicator box 20 has two sockets 30, 31. In the preferred embodiment, a single pronged plug is used to connect the magnetic reed switches 18, 19 to the indicator box 20. The wire harness 22 extends from the magnetic reed switches 18, 19 and connects to the indicator box 20 at a socket 31. The other socket 30 is used to connect the indicator box 20 to a power supply 21. A separate fused wire 25 connects the power supply 21 to the indicator box 20. In the preferred embodiment, the other end of this fused wire 25 is connected to a fuse lock in the boat 10. Thus, the battery in the boat 10 provides the power for the indicator box 20.

Figure 8:
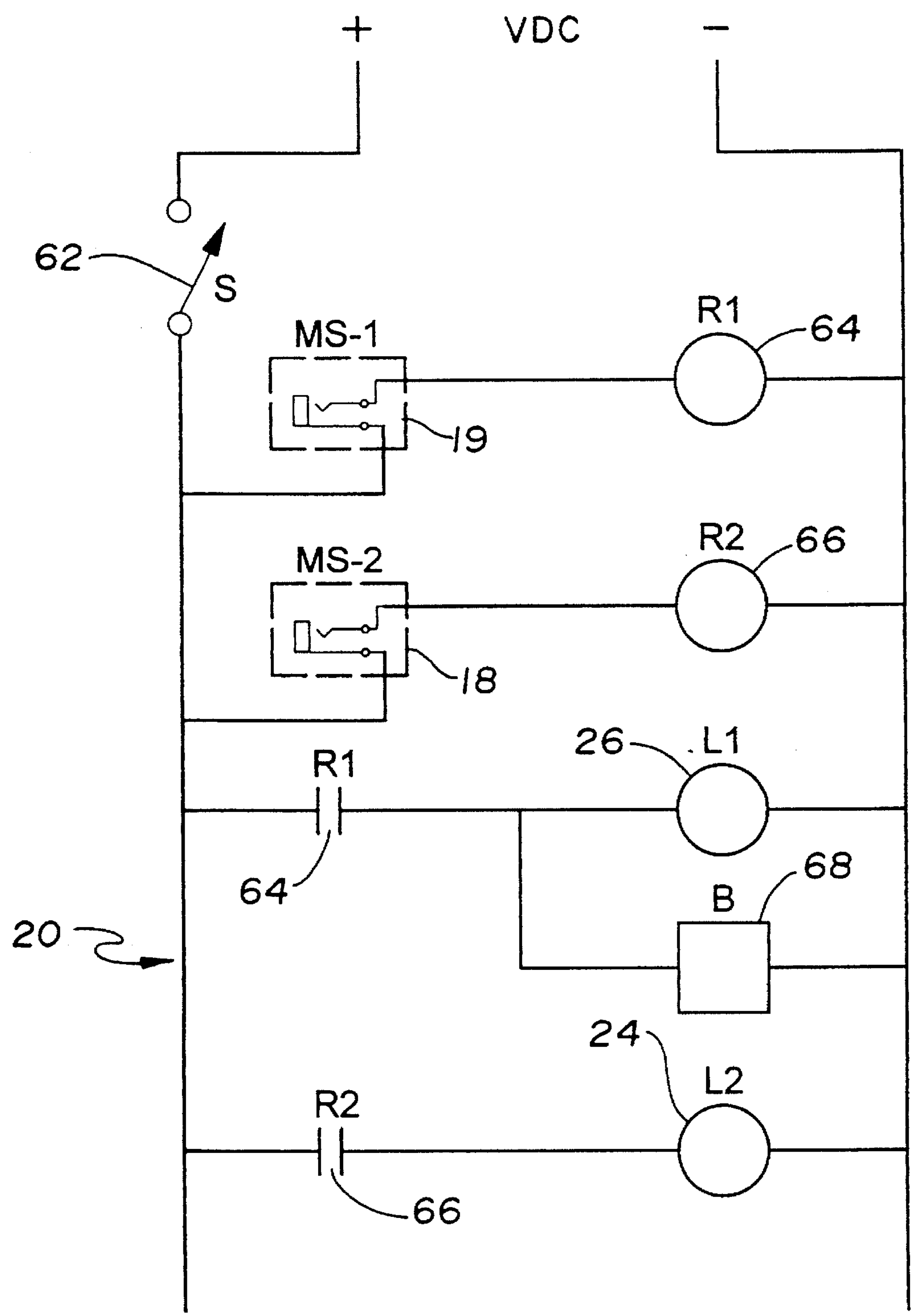
FIG. 8 shows a schematic diagram of the circuitry in the indicator box.

FIG. 8 shows the circuitry inside the indicator box 20. The indicator box 20 is connected to a 12 Volt DC power supply such as the battery in a boat. There is a power switch 62 which can be closed by plugging in the wire from the battery into the indicator box 20. The lead wire from the magnetic reed switches 18, 19 is attached to the 12 Volt DC power supply at the indicator box 20. A first relay 64 and a second relay 66 is interposed between each magnetic reed switch 18, 19 and the power supply 21. The first relay 64 is connected to the amber light 26 and the buzzer 68, such that the amber light 26 and the buzzer 68 are connected in parallel. The second relay 66 is connected to the green light 24. Once the first magnetic reed switch 19 closes, the power from the battery flows through the relay 64 to the amber light 26 and the buzzer 68, thereby turning on the light 26 and sounding the buzzer 68. When the second magnetic reed switch 18 is closed, the power from the battery flows through the second relay 66, thereby turning on the green light 24.

In an alternative embodiment, the apparatus may be sold as an optional feature of other equipment currently designed for use with boats such as a fish finder or a depth finder. In this case, the power supply used in these devices would also supply the power to the indicator box 20.

Although the preferred embodiment has two visual indicators and an audio indicator, the present invention can be practiced with only one indicator.

Also, as shown in FIGS. 1–3, the permanent magnets 32, 33 are attached to the boat trailer 11 along its central, longitudinal axis 23. In the preferred embodiment, the permanent magnets 32, 33 are attached to the boat trailer 11 by a float 12, an arm assembly 14, and a bracket 16. The float 12 is made of foam in the preferred embodiment. However, the float 12 can be made of other material which will still allow the float 12 not to sink when it is immersed in water with a boat trailer 11. When the boat trailer 11 is immersed in water, the float 12 will move vertically relative to the boat trailer 11. Consequently, the float 12 is visible when the boat trailer 11 is immersed in water.

Figures 4, 6, 7:
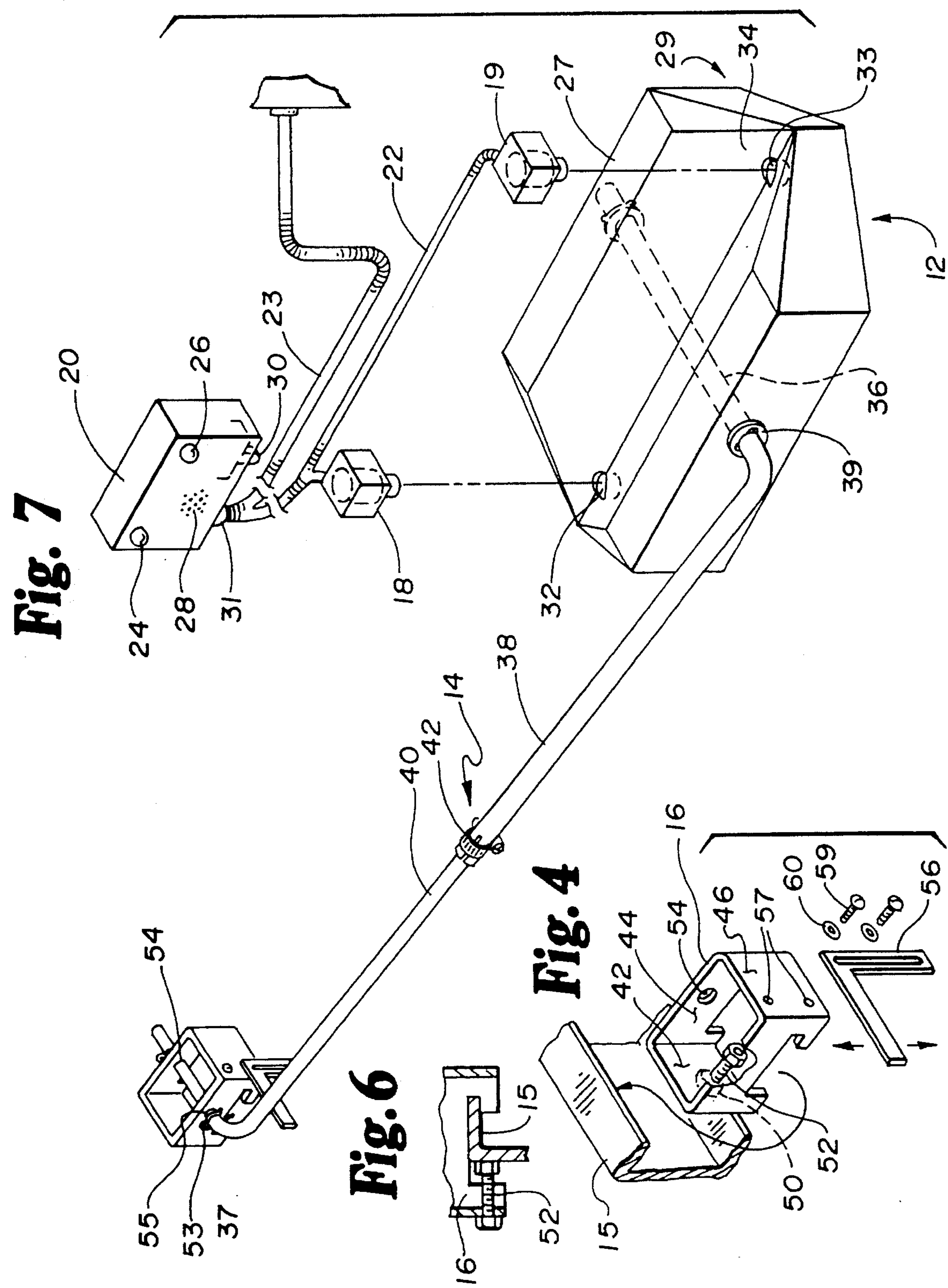
FIG. 4 shows an exploded view of a bracket shown with a fragment of a cross frame from a typical boat trailer.
FIG. 6 shows a fragmentary detail view of the cross frame with the bracket installed.
FIG. 7 shows a perspective view of the present invention.

As shown in FIG. 7, the float 12 has a top side 27 and a bottom side 29. In the preferred embodiment, two permanent magnets 32, 33 are embedded on the top side 27 of the float 12. The permanent magnets 32, 33 are spaced twelve inches apart. Although the permanent magnets 32, 33 are embedded in the top side 27 of the float 12, the permanent magnets 32, 33 may be attached to the top side 27 of the float 12 in another manner such as gluing the permanent magnets 32, 33 onto the top side 27. Also, although permanent magnets 32, 33 are used in the present invention, other types of magnets may be used with this invention. Moreover, the permanent magnets can be located anywhere on the boat trailer 11 as long as the permanent magnets 32, 33 are adjacent the magnetic reed switches 18, 19 in the boat 10 when the boat 10 is properly positioned onto the boat trailer 11.

The top side 27 of the float 12 has a "V" shaped cut 34 for receiving the hull of a boat 10. The "V" shaped cut 34 is designed to receive the hull of a boat 10 when the boat 10 is on the boat trailer 11.

As illustrated in FIG. 7, in the preferred embodiment, the arm assembly 14 is comprised of a float arm 38 and a bracket arm 40. The bracket arm 40 has two holes 37 for receiving a fastener such as a clip 53 (shown in FIG. 5). The arm assembly 14 has a clamp 42 located on the bracket arm 40. This clamp 42 allows for telescoping of the arm assembly 14 and for adjusting the distribution distance of the float 12. This adjustable arm assembly 14 allows the float 12 to be located in a position where the permanent magnets 32, 33 are adjacent the magnetic reed switches 18, 19 in the hull of the boat 10, when the boat 10 is properly positioned onto the boat trailer 11.

The diameter of the float arm 38 is larger than the diameter of the bracket arm 40. Consequently, the bracket arm 40 can be slid inside the float arm 38. The clamp 42 is tightened to prevent the bracket arm 40 from sliding further into the float arm 38. The float arm 38 and the bracket arm 40 have an "L" shape. However, the arm assembly 14 can be of any shape as long as the permanent magnets 32, 33 are adjacent the magnetic reed switches 18, 19 in the hull of the boat 10 when the boat 10 is properly positioned onto the boat trailer 11.

In the preferred embodiment, the float arm 38 is rotatably attached to the float 12. The float 12 has a bore 36 for receiving the float arm 36. A fastener 39 is placed on the end of the float arm 38 after the float arm 38 has been inserted into the float 12. This fastener 39 prevents the float arm 38 from sliding out of the float 12.

Figure 5:
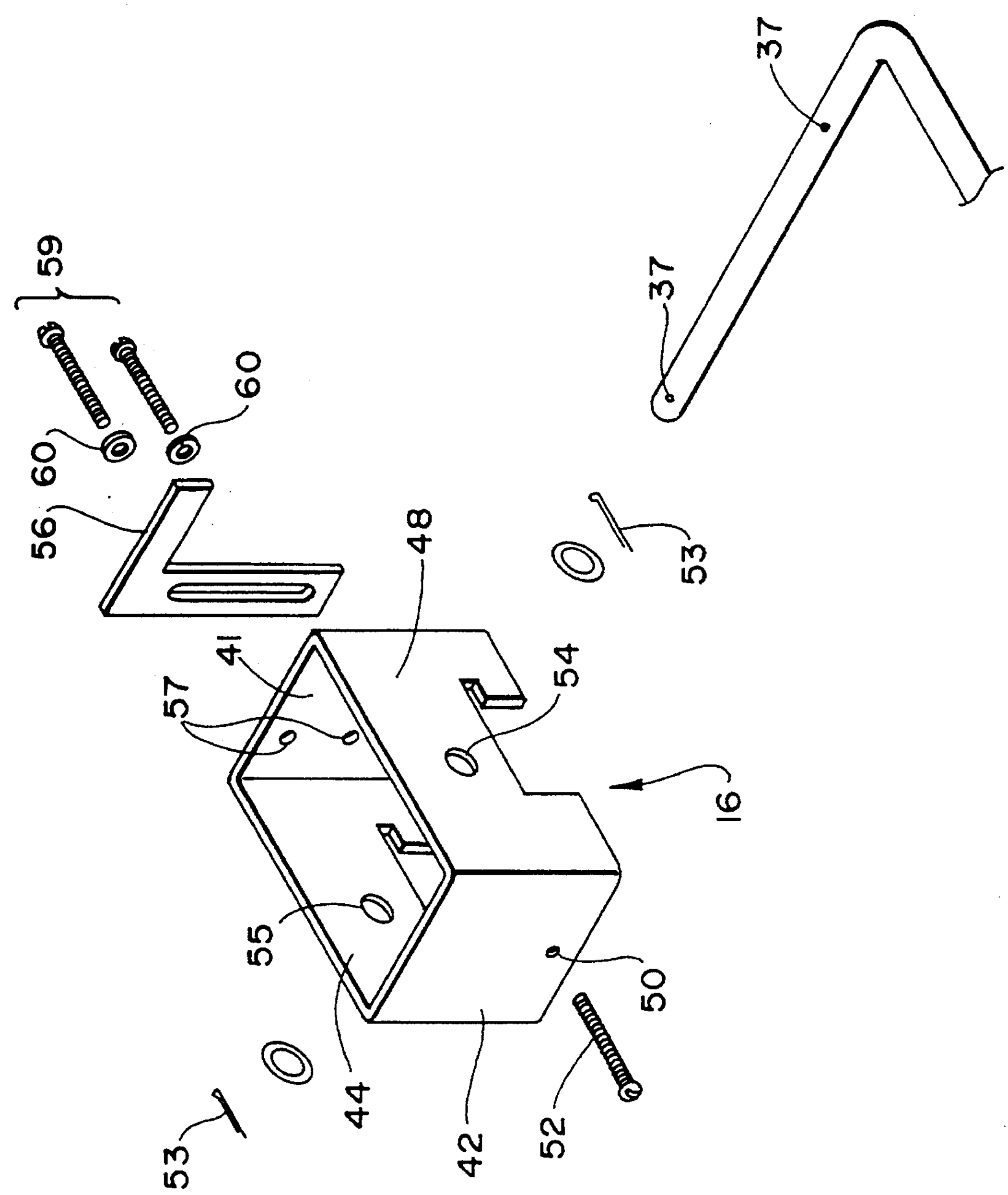
FIG. 5 shows a side view of a bracket and a bracket arm assembly.

As illustrated in FIG. 7, the bracket arm 40 is rotatably attached to the bracket 16. As shown in FIGS. 4–5, the bracket 16 is comprised of a first side 42, a second side 44, a third side 46, and a fourth side 48 assembled into a rectangular structure. There is a bore 50 for threadably receiving a set screw 52 on the first side 42. As shown in FIGS. 1 and 6, this set screw 52 secures the bracket 16 to the cross frame 15 of the boat trailer 11. Also, a nut can be threadably inserted into the bore 50 with a bolt to secure the bracket 16 to the cross frame 15 of the boat trailer 11.

There are holes 54, 55 tapped on each of the second 44 and fourth 48 sides for receiving the bracket arm 40. The reason a hole was tapped on both the second and fourth sides 44, 48 of the bracket 16 was to make the bracket 16 a universal bracket. Under the present design, the bracket 16 can be used on any boat trailer. The bracket arm 40 is slid through both holes 54, 55 and held in place by clips 53 which are placed in holes 37 in the bracket arm 40. These clips 53 prevent the bracket arm 40 from sliding out of the bracket 16. However, the clips 53 do not prevent the bracket arm 40 from rotating within the tapped holes 54, 55 of the bracket 16.

Furthermore, the third side 46 of the bracket 16 has two holes 57 for threadably receiving two screws 59 with washers 60 which hold an adjustable lever 56 in place. The adjustable lever 56 can be moved upward and downward by loosening the screws 59. This adjustable lever 56 ensures that the float 12 be in constant contact with the hull of a boat 10. Also when traveling, the float 12 will stay tight to the hull of the boat 10. Thereby, the float 12 will not become damaged or dislodged by the force of the wind or other objects when the boat trailer 11 is being pulled down the road. Also, this adjustable lever 56 ensures constant contact with the hull of the boat 10 when loading the boat 10 and the water is being washed on to the float 12 by the propeller of the boat 10.

The arm assembly 14 in conjunction with the bracket 16 is used to support the float 12 and position the float 12 so that the permanent magnets 32, 33 in the float 12 are attached to the boat trailer 11 along the central, longitudinal axis 23 of the boat trailer 11. Attaching the float 12 to the boat trailer 11 as indicated above provides the boat driver with a visual indication of the location of the float 12 which in turn indicates the location of the central, longitudinal axis 23 of the boat trailer 11. The boat driver can steer the bow of the boat onto the visible float 12 to properly position the boat 10 onto the boat trailer 11. However, the arm assembly 14 can be constructed with the diameter of the bracket arm 40 being larger than the diameter of the float arm 38. In this embodiment, the bracket arm 40 would slide inside the float arm 38. The clamp 42 would be on the float arm 38.

Previously, the installation of the components in the boat 10 and boat trailer 11 have been discussed. This section of the detailed description will discuss the alignment of the magnetic reed switches 18, 19 with the permanent magnets 32, 33 in the float 12 so that the permanent magnets 32, 33 are adjacent the magnetic reed switches 18, 19 when the boat 10 is properly positioned onto the boat trailer 11.

Before aligning the permanent magnets 32, 33 and the magnetic reed switches 18, 19, the magnetic reed switches 18, 19 should be electrically connected to the indicator box 20 and the indicator box 20 should be connected to a power supply 21. Furthermore, the boat 10 should be properly positioned onto the boat trailer 11. Also, the bracket 16 with the bracket arm 40 should be secured to the cross frame 15 of the boat trailer 11, and the float arm 38 with the float 12 should be slidably connected to the bracket arm 40.

To align the permanent magnets 32, 33 with the magnetic reed switches 18, 19 inside the boat 10, the installer slides the float 12 along the hull of the boat 10. When the permanent magnet 32 located towards the front of the boat trailer 11 is adjacent the magnetic reed switch 19 which is closer to the back of the boat 10, the amber light 26 on the indicator box 20 will light up and a buzzer 68 will be sounded through the speaker holes 28 in the indicator box 20. At this point, the float 12 should be slid another 12 inches along the hull of the boat 10. When both the amber 26 and green 24 lights on the indicator box 20 light up and a buzzer 68 sounds through the speaker holes 28 of the indicator box 20, the permanent magnets 32, 33 in the float 12 are adjacent with the magnetic reed switches 18, 19 in the bilge 17 of the boat 10. The clamp 42 is then tightened to hold the float 12 at this location. Then, the adjustable lever 56 on the bracket 16 is moved upwards so that the adjustable lever 56 pushes the arm assembly 14 with the float 12 toward the hull of the boat 10. The screws 59 are tightened to hold the adjustable lever 56 in place. This procedure with the adjustable lever 56 is to ensure that the float 12 with the permanent magnets 32, 33 will be in constant contact with the hull of the boat 10 when the boat is on the boat trailer 11.

In operation, when a boat driver is loading the boat 10 onto the boat trailer 11, the boat trailer 11 with the float 12 is backed into the water. The boat driver can see the float 12. The float 12 indicates the central, longitudinal axis 23 of the boat trailer 11. The boat driver points the bow of the boat towards the float 12. When the first embedded permanent magnet 32 in the float is adjacent the first magnetic reed switch 19, the amber light 26 on the indicator box 20 lights up and a buzzer 68 is sounded. The amber light 26 and the buzzer 68 notify the boat driver that within 12 inches the boat 10 will be in the proper position on the boat trailer 11. The driver inches the boat forward on the boat trailer 11 (as illustrated in FIG. 2).

As shown in FIG. 3, the boat 10 is properly positioned onto the boat trailer 11, when the magnets 32, 33 are adjacent the magnetic reed switches 18, 19 in the boat 10. When the boat trailer 11 is properly positioned onto the boat 10, the magnetic reed switches 18, 19 close because of the magnetic field from the permanent magnets 32,33. The closing of the magnetic reed switches 18, 19 causes the amber and green lights 26,24 to light up on the indicator box 20 and the buzzer 68 to sound through the speaker holes 28 of the indicator box 20. The lights 24,26 and the buzzer 68 will notify the boat driver that the boat 10 is in the proper position on the boat trailer 11 and that the boat 10 can be safely pulled out of the water.

While preferred embodiments of the present invention have been described, it should be appreciated that various modifications may be made by those skilled in the art without departing from the spirit and scope of the present invention. Accordingly, reference should be made to the claims to determine the scope of the present invention.

What is claimed is:

1. An apparatus for positioning a boat onto a boat trailer comprising:

two magnetic reed switches adapted to be attached inside the bilge of a boat, said magnetic reed switches located along a central, longitudinal axis of the boat;

an indicator box adapted to be mounted in the boat and electrically connected to said reed switches for providing a signal indicating that the boat is properly positioned onto the boat trailer;

two permanent magnets adapted to be attached to the boat trailer along a central, longitudinal axis thereof and separated by a distance approximately equal to the distance between said magnetic reed switches, whereby when the boat is moved onto the boat trailer such that the permanent magnets attached to the trailer are adjacent to the magnetic reed switches inside the boat, the magnetic reed switches are closed thereby causing the indicator box to signal that the boat is properly positioned onto the boat trailer.

2. The apparatus for positioning a boat onto a boat trailer as recited in claim 1, wherein the two permanent magnets are attached to a float, which moves vertically relative to the boat trailer when the boat trailer is immersed in water said float provides visual indication of the location of the float with respect to the boat trailer.

3. The apparatus for positioning a boat onto a boat trailer as recited in claim 2, wherein the indicator box is electrically connected to a power supply.

4. The apparatus for positioning a boat onto a boat trailer as recited in claim 3, further comprising:

a bracket fixedly attached to said boat trailer; and an arm assembly rotatably connecting the bracket and the float, thereby providing a means for moving the float to a position in which the float is in contact with the hull of the boat.

5. The apparatus for positioning a boat onto a boat trailer as recited in claim 4, wherein the bracket further comprises an adjustable lever for ensuring that the float remain substantially in constant contact with the hull of the boat when the boat is loaded onto the boat trailer.

6. The apparatus for positioning a boat onto a boat trailer as recited in claim 5, wherein said arm assembly further comprises:

a bracket arm which rotatably attaches to said bracket;

a float arm which rotatably attaches to the float and is slidably connected to the bracket arm; and a clamp located on one of the float arm and the bracket arm for holding the arm assembly at a desired length.

7. The apparatus for positioning a boat onto a boat trailer as recited in claim 6, wherein the box indicator has at least one visual indicator.

8. The apparatus for positioning a boat onto a boat trailer as recited in claim 6, wherein the box indicator has an audio indicator.

9. An apparatus for positioning a boat onto a boat trailer comprising:

at least two magnetic reed switches adapted to be attached inside the bilge of a boat, said magnetic reed switches located along a central, longitudinal axis of the boat;

an indicator box adapted to be mounted in the boat and electrically connected to said magnetic reed switches for providing a signal indicating that the boat is properly positioned onto the boat trailer;

a float adapted to be attached to the boat trailer which will rise vertically with respect to the boat trailer when the boat trailer is immersed in water, said float providing a visual indication of the location of the float with respect to the boat trailer;

at least two permanent magnets attached to said float, whereby when the boat is moved onto the boat trailer such that the permanent magnets are adjacent the magnetic reed switches inside the boat, the magnetic reed switches are closed, thereby causing the indicator box to signal that the boat is properly positioned onto the boat trailer.

10. The apparatus for positioning a boat onto a boat trailer as recited in claim 9, wherein the indicator box is electrically connected to a power supply.

11. The apparatus for positioning a boat onto a boat trailer as recited in claim 10, further comprising:

a bracket fixedly attached to said boat trailer; and an arm assembly rotatably connecting the bracket and the float, thereby providing a means for moving the float to a position in which the float is in contact with the hull of the boat.

12. The apparatus for positioning a boat onto a boat trailer as recited in claim 11, wherein the bracket further comprises an adjustable lever for ensuring that the float remain in constant contact with the hull of the boat when the boat is loaded onto the boat trailer.

13. The apparatus for positioning a boat onto a boat trailer as recited in claim 12, wherein said arm assembly further comprises:

a bracket arm which rotatably attaches to said bracket;

a float arm which rotatably attaches to the float and is slidably connected to the bracket arm; and a clamp located on one of the float arm and the bracket arm for holding the arm assembly at a desired length.

14. The apparatus for positioning a boat onto a boat trailer as recited in claim 13, wherein the box indicator has at least one visual indicator.

15. The apparatus for positioning a boat onto a boat trailer as recited in claim 13, wherein the box indicator has an audio indicator.

16. An apparatus for positioning a vehicle onto a carriage comprising:

at least two magnetic reed switches adapted to be attached to the vehicle inside the vehicle;

an indicator box adapted to be mounted in the vehicle and electrically connected to the magnetic reed switches for providing a signal indicating that the vehicle is properly positioned onto the carriage; and at least two permanent magnets adapted to be attached to the carriage, wherein the permanent magnets attached to the carriage are adjacent to the magnetic reed switches when the vehicle is properly positioned onto the carriage, whereby when the vehicle is moved onto the carriage the permanent magnets are adjacent to the magnetic reed switches and the magnetic reed switches are closed, thereby causing the indicator box to signal that the vehicle is properly positioned onto the carriage.

17. The apparatus for positioning a vehicle onto a carriage as recited in claim 16, wherein the permanent magnets are attached to a float, which moves vertically relative to the carriage when the carriage is immersed in water, said float providing a visual indication of the location of the carriage.

18. The apparatus for positioning a vehicle onto a carriage as recited in claim 17, wherein the indicator box is electrically connected to a power supply.

19. The apparatus for positioning a vehicle onto a carriage as recited in claim 18, further comprising:

a bracket fixedly attached to said carriage; and an arm assembly rotatably connecting the bracket and the float, thereby providing a means for moving the float to a position in which the float is in contact with the vehicle.

20. The apparatus for positioning a vehicle onto a carriage as recited in claim 19, wherein the bracket further comprises an adjustable lever for ensuring that the float remains substantially in constant contact with the vehicle when the vehicle is loaded onto the carriage.

21. The apparatus for positioning a vehicle onto a carriage as recited in claim 20, wherein said arm assembly further comprises:

a bracket arm which rotatably attaches to said bracket;

a float arm which rotatably attaches to the float and is slidably connected to the bracket arm; and a clamp located on one of the float arm and the bracket arm for holding the arm assembly at a desired length.

22. The apparatus for positioning a vehicle onto a carriage as recited in claim 21, wherein the box indicator has at least one visual indicator.

23. The apparatus for positioning a vehicle onto a carriage as recited in claim 21, wherein the box indicator has an audio indicator.

24. An apparatus for positioning a vehicle with respect to a carriage comprising:

a magnetic reed switch adapted to be attached to the vehicle;

an indicator box adapted to be mounted in the vehicle and electrically connected to the magnetic reed switch for providing a signal indicating that the vehicle is properly positioned with respect to the carriage; and a permanent magnet adapted to be attached to the carriage, whereby, when the vehicle is properly positioned with respect to the carriage, the permanent magnet is adjacent to the magnetic reed switch and the magnetic reed switch is closed, thereby causing the indicator box to signal that the vehicle is properly positioned with respect to the carriage.

25. The apparatus for positioning a vehicle onto a carriage as recited in claim 24, wherein the permanent magnet is attached to a float, which moves vertically relative to the carriage when the carriage is immersed in water said float providing a visual indication of the location of the carriage.

26. The apparatus for positioning a vehicle onto a carriage as recited in claim 25, wherein the indicator box is electrically connected to a power supply.

27. The apparatus for positioning a vehicle onto a carriage as recited in claim 26, further comprising:

a bracket fixedly attached to said carriage; and an arm assembly rotatably connecting the bracket and the float, thereby providing a means for moving the float to a position in which the float is in contact with the hull of the boat.

28. The apparatus for positioning a vehicle onto a carriage as recited in claim 27, wherein the bracket further comprises an adjustable lever for ensuring that the float remain in constant contact with the vehicle when the vehicle is loaded onto the carriage.

29. The apparatus for positioning a vehicle onto a carriage as recited in claim 28, wherein said arm assembly further comprises:

a bracket arm which rotatably attaches to said bracket;

a float arm which rotatably attaches to the float and is slidably connected to the bracket arm; and a clamp located on one of the float arm and the bracket arm for holding the arm assembly at a desired length.

30. The apparatus for positioning a vehicle onto a carriage as recited in claim 29, wherein the box indicator has at least one visual indicator.

31. The apparatus for positioning a vehicle onto a carriage as recited in claim 29, wherein the box indicator has an audio indicator.

* * * * *